United States Patent [19]

Baehr

[11] 4,428,609
[45] Jan. 31, 1984

[54] LATCH FOR FLEXIBLY JOINING TRAILING EDGE ACCESS DOORS ON AN AIRCRAFT ENGINE SUPPORT PYLON

[75] Inventor: Theodore C. Baehr, Bellevue, Wash.

[73] Assignee: The Boeing Company, Seattle, Wash.

[21] Appl. No.: 187,385

[22] Filed: Sep. 15, 1980

[51] Int. Cl.³ .............................................. E05C 5/04
[52] U.S. Cl. .................................................. 292/251
[58] Field of Search ............. 292/251, 256.71, 256.73, 292/256.75, DIG. 55

[56] References Cited

U.S. PATENT DOCUMENTS 4,061,373 12/1977 Revell ................................. 292/251

FOREIGN PATENT DOCUMENTS 26670 10/1923 France .................................. 292/251
3244 of 1910 United Kingdom ................ 292/251

Primary Examiner—Robert L. Wolfe
Attorney, Agent, or Firm—Conrad O. Gardner; B. A. Donahue

[57] ABSTRACT

A latch assembly including a female funnel-shaped member for guiding a clamping pin into the locking receptacle at the closed end of the funnel for preventing improper thread engagement. The latch assembly includes a centering arrangement in both the pin and funnel supports for providing alignment without restricting in-flight lateral movement of trailing edge access doors on outboard struts containing spring beam attachment to the wing.

1 Claim, 6 Drawing Figures

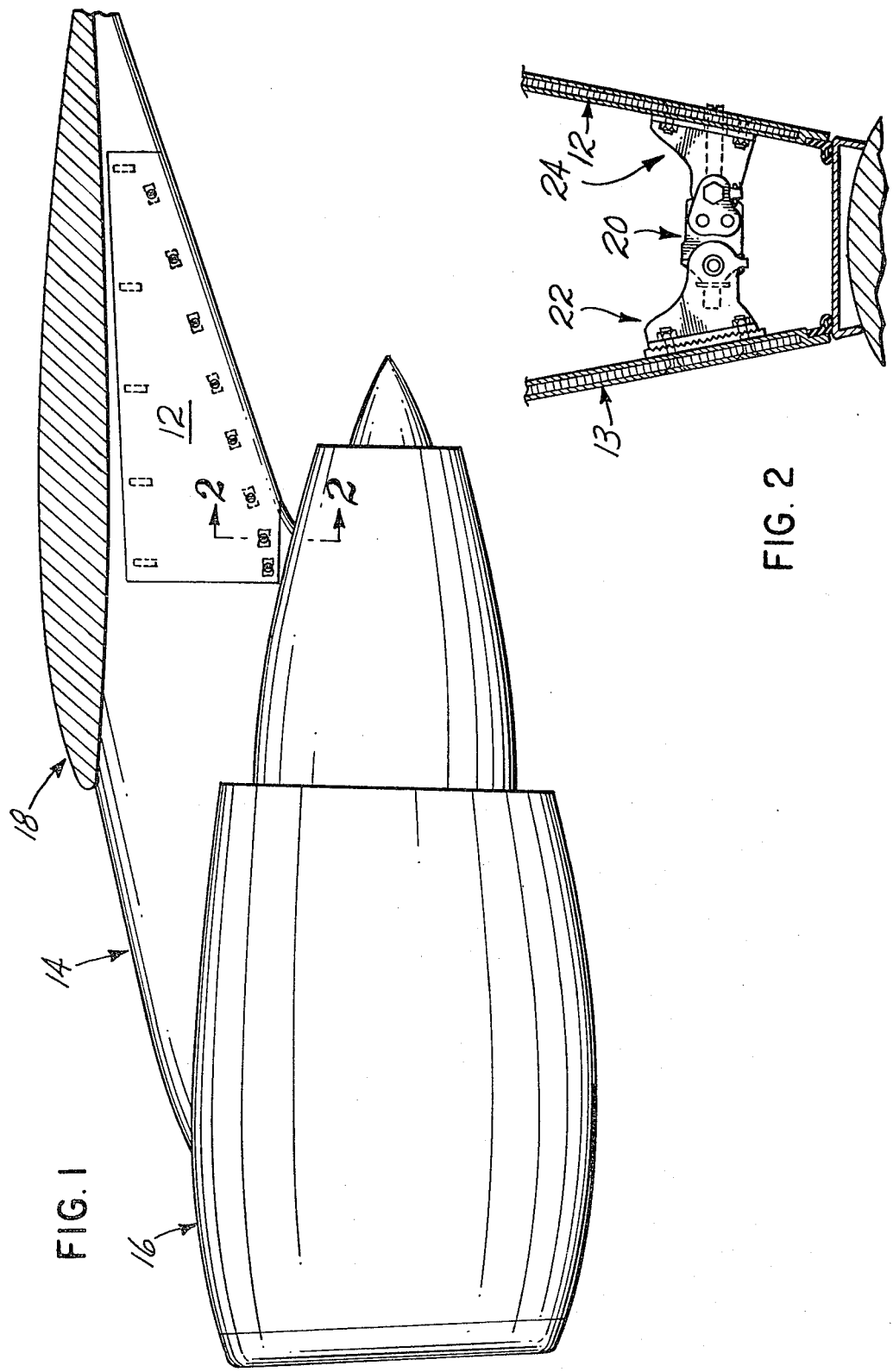

LATCH FOR FLEXIBLY JOINING TRAILING EDGE ACCESS DOORS ON AN AIRCRAFT ENGINE SUPPORT PYLON

This invention relates to latch assemblies and more particularly to latching means for fastening a pair of doors to each other forming the point of a vee (V) with hinges at the edges opposite the point of the vee, adaptable particularly to the trailing edge access doors on an aircraft engine support pylon.

Heretofore, funnel features have been seen in the patent literature, including U.S. Pat. No. 1,947,524; French Patent No. 28345; and German Patent No. 1,190,834.

Turning more particularly to the present problem, it should be noted that the aft portion of the engine strut of an aircraft consists of a large door on each side which, when closed together, form the trailing edge vee of the nacelle strut. These doors are currently secured together in certain commercial aircraft by bolt-type latches which are somewhat difficult to engage and do not tend to provide the sufficient lateral movement in flight for the doors on the outboard struts containing spring beam attachment to the wing of the aircraft. Outboard struts with spring beam attachment are used to install several types of engines on certain jumbo jet aircraft.

It is accordingly an object of the present invention to provide a latch assembly for large doors of an aircraft whereby alignment of the latch is facilitated.

In accordance with an embodiment of the present invention, there is provided a funnel configuration associated with a locking receptacle into which a clamping pin is adapted to be received. Further, each latch unit is provided with pivot means, thereby permitting lateral movement of the doors (as a unit) in flight to match the normal movement of the strut. The female portion of the latch assembly comprising the funnel configuration and associated locking receptacle, and the male portion of the latch assembly comprising the clamping pin are both provided with features to facilitate centering.

A full understanding of the invention, and of its further objects and advantages and the several unique aspects thereof, will be had from the following description when taken in conjunction with the accompanying drawings in which:

FIG. 1 is a side view of aircraft structure illustrative of trailing edge access doors on an aircraft engine support pylon;

FIG. 2 is a section taken along the line 2—2 of FIG. 1 showing the present latch assembly with trailing edge access doors of FIG. 1 shown secured in a latched condition;

Figure 3:
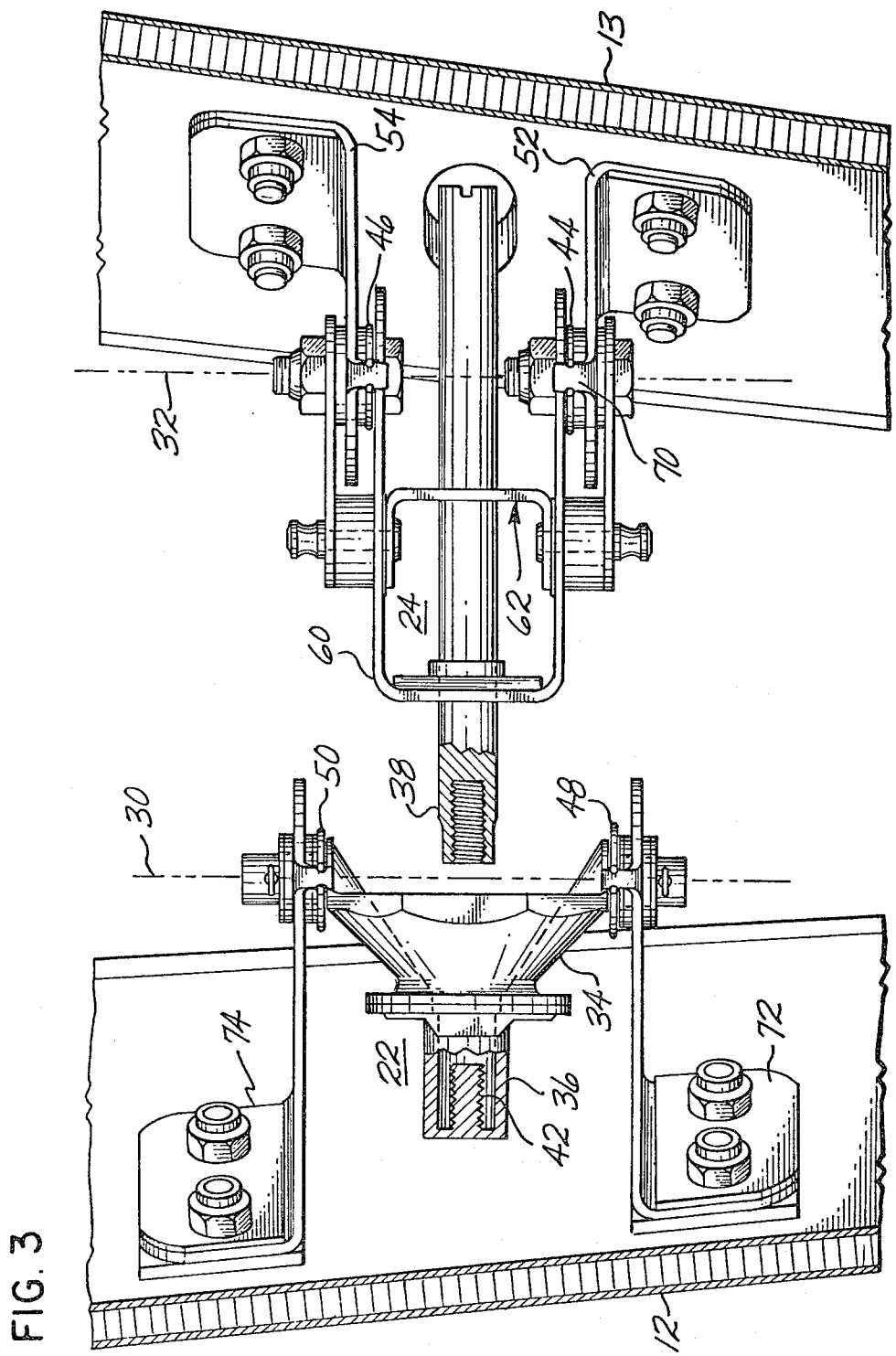
FIG. 3 is a plan view of a first embodiment of the present latch assembly shown in an unlatched condition.

Turning now to FIG. 1, it will be seen that engine strut structure is surrounded by an aircraft engine strut trailing edge door 12 so that the function and importance of secure latching means therefor can be better appreciated. In the vicinity of engine strut trailing edge door 12 can be seen strut structure 14, engine and cowling 16, and wing 18. Aft of strut structure 14 is seen large doors 12 and 13, which, when closed together (as seen in FIG. 2 in a latched condition) form the trailing edge vee of the nacelle strut. Engine strut trailing edge doors 12 and 13 have heretofore been secured together by bolt-type latches which are difficult to engage and do not provide for sufficient lateral movement in flight for doors 12 and 13 on the outboard struts containing spring beam attachment to wing 18.

Looking at the sectional view of FIG. 2 taken along the lines 2—2 of FIG. 1, it can be seen that the present latch assembly 20 includes a pair of sub assemblies 22 and 24. Sub assemblies 22 and 24 are mounted respectively on engine strut trailing edge doors 12 and 13, and are gimballed with one plane of freedom to accommodate some relative movement of latched parts and to facilitate alignment of the latch parts as will be seen hereinafter in more detail.

Figure 4:
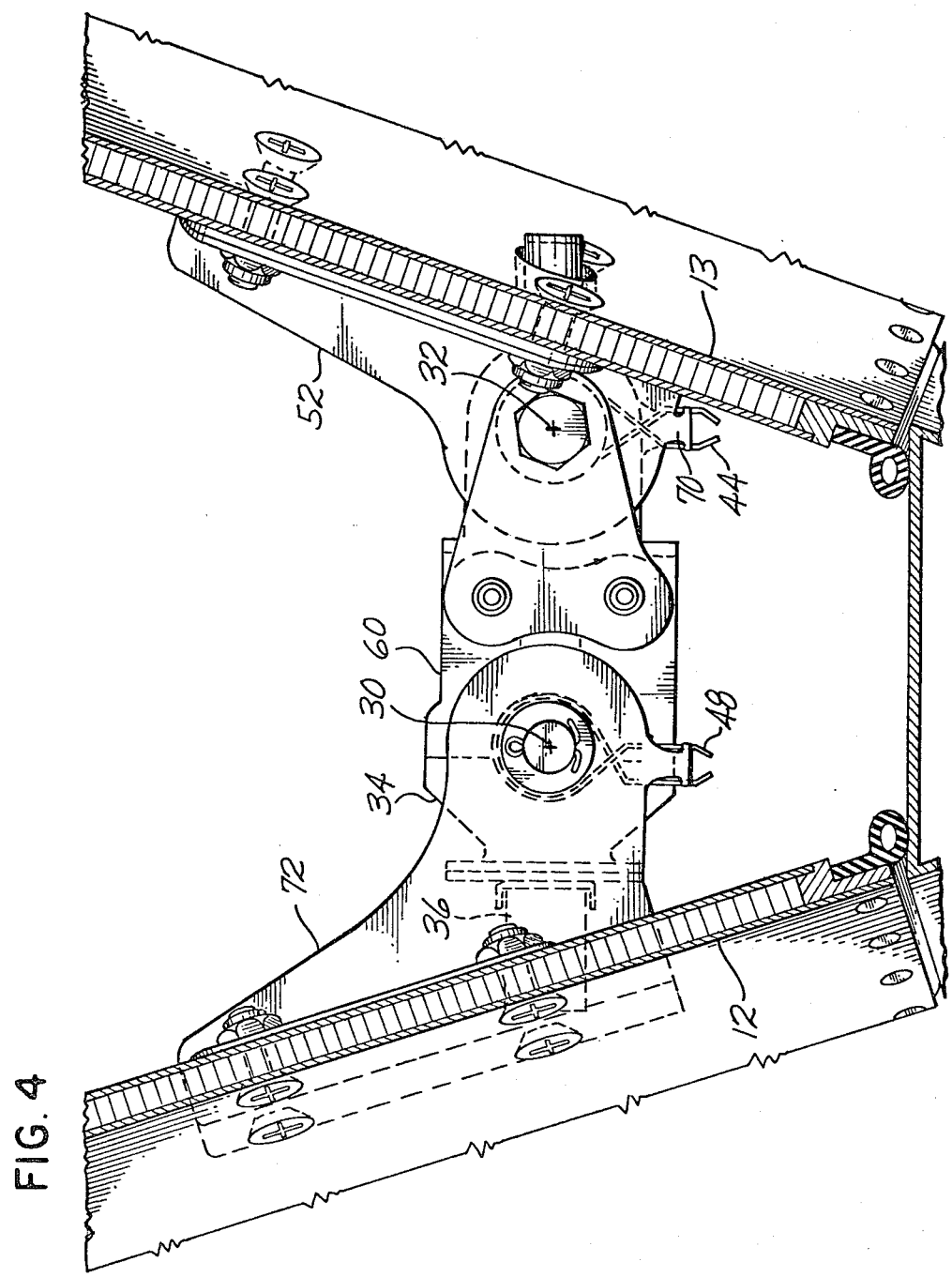
FIG. 4 is a rear view of the first embodiment of the latch assembly of FIG. 3 shown in a latched condition.

Referring to the first embodiment of latch assembly 20, FIG. 3 shows detailed plan view in an unlatched condition, pivoting axes 30 and 32 are seen for female sub assembly 22 and male sub assembly 24 respectively. Female sub assembly is seen to include funnel-shaped casting 34 having locking receptacle 36 at the closed end thereof, funnel-shaped casting 34 providing means for guiding clamping pin 38 into locking receptacle 36 for proper thread engagement of internal threaded end portion of clamping pin 38 with inner threaded stud portion of locking receptacle 36. A pair of centering springs 44 and 46 (centering spring 44 seen more clearly in the rear view of FIG. 4) provide centering of clamping pin 38 for insertion in funnel-shaped member 34 while centering springs 48 and 50 provide a corresponding aid in centering of funnel-shaped member 34 for receipt and insertion of clamping pin 38. As further seen in FIG. 3, a pair of angle mounting brackets 52 and 54 have corresponding base portions permanently fastened to engine strut trailing edge door 13 with the other ends thereof supporting clamping pin 38 by means of sheet metal channel pin holder 60 having an internal channel support member 62. Centering spring 44 can be seen (see FIG. 4) to be wound about pivoting axis 32 with ends disposed about lug 70 extending from the lower portion of mounting bracket 52.

On female sub assembly 22 centering spring 48 can be seen (FIG. 4) to be wound about pivoting axis 30 with ends disposed about lugs on 72 and 74 angle mounting brackets as seen in FIG. 3 are centering springs 48 and 50.

Figure 5:
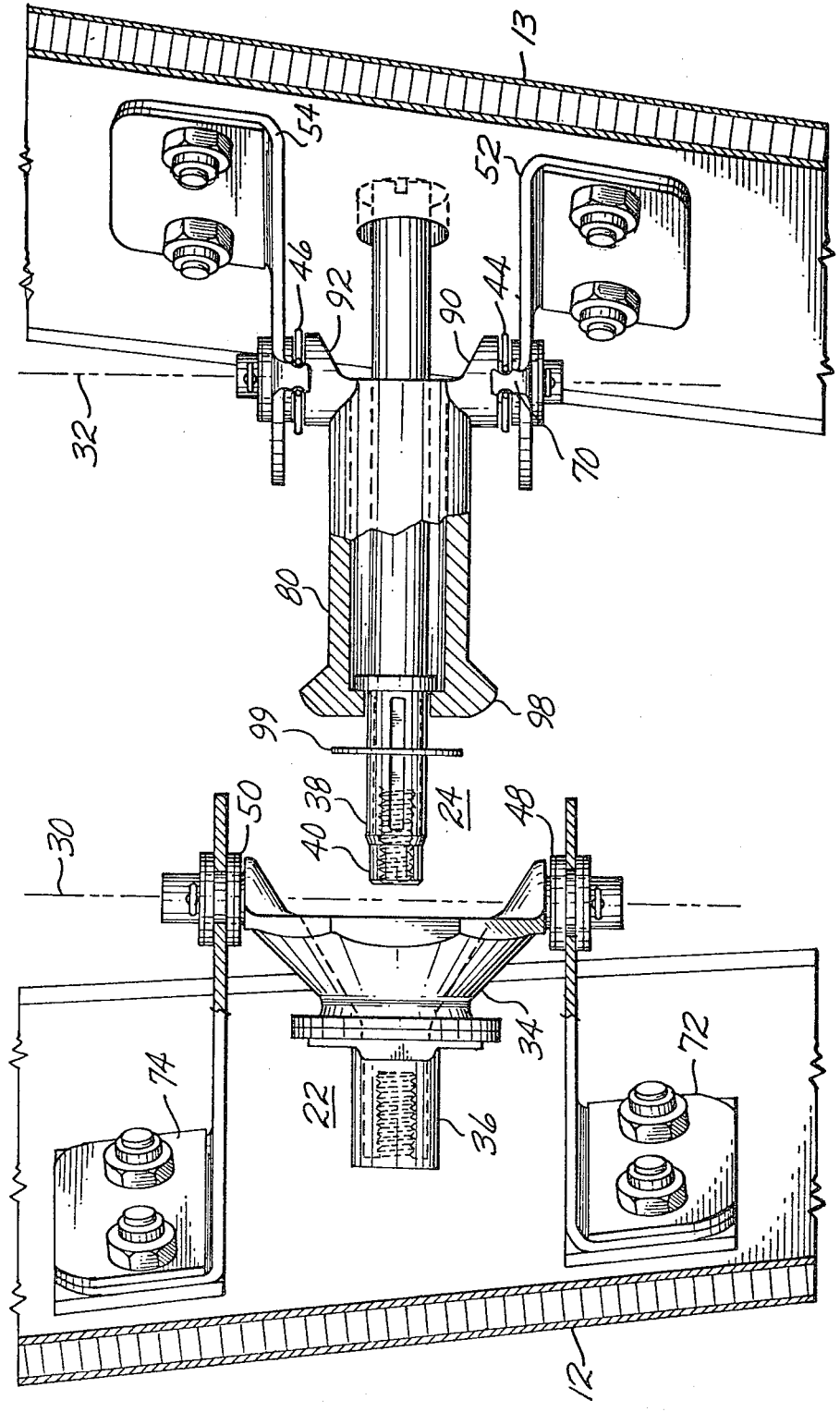
FIG. 5 is a plan view of a second embodiment of the present latch assembly shown in an unlatched condition; and, FIG. 6 is a rear view of the second embodiment of the latch assembly of FIG. 5 shown in a latched condition.
Figure 6:
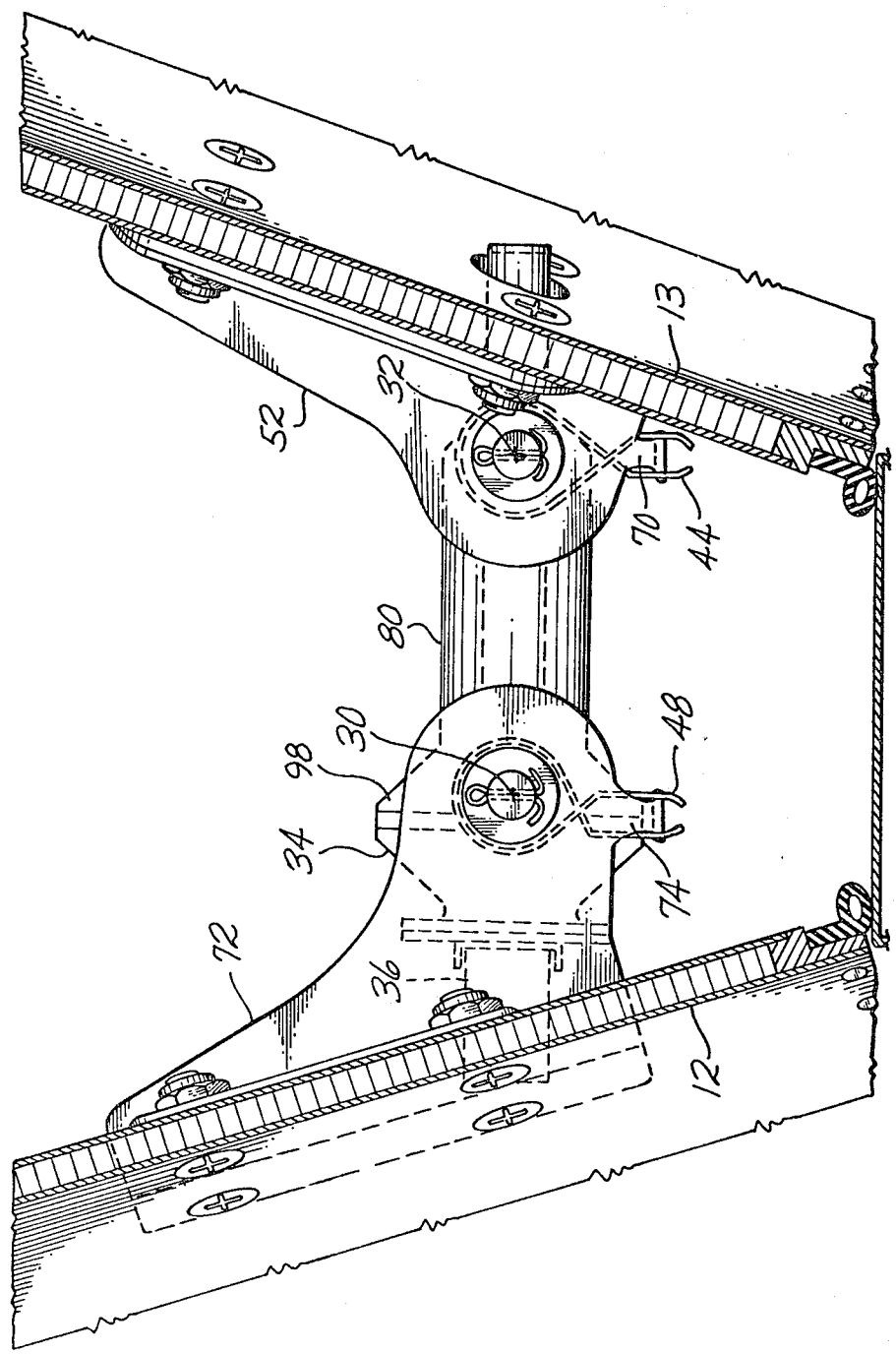

A comparison of the first embodiment shown in FIG. 3 with the second embodiment of latch assembly shown in FIG. 5 will reveal that female sub assemblies 22 are identical, and further, that the several sub assembly 24 parts such as bolts and nuts and including sheet metal channel pin holder 60 and internal channel support 62 utilized between angle mounting brackets 52 and 54 and clamping pin 38 for support thereof for centering about pivot axis 32 of the first embodiment of FIG. 3 have been replaced by a single integral part comprising support casting 80 having a pair of internal trunnions 90 and 92 at one end thereof for support by angle mounting brackets 52 and 54 via respective bushings 94 and 96. The other end of pin support casting 80 is seen to comprise a generally flared outward portion 96 ot fit against funnel-shaped member 34 (see also FIG. 6). The pin 38 is inserted through the casting 80 and retained by tabbed washer and pin slots.

Funnel-shaped member 34 as seen of importance in the hereinabove described embodiments guides clamping pin 38 into locking receptacle 36 at the end of the funnel, thus eliminating improper thread engagement which tends to damage threads with resultant loss of latch integrity. It may be further noted that pivot points of both assemblies 22 and 24 are located such that screwdriver pressure applied for latch engagement aids and improves alignment of threads to be engaged thus eliminating possibilities of cross threading and subsequent failure of latch. Positive latch engagement is also aided by centering springs on both pin and funnel sub assemblies to provide alignment for latching while not tending to restrict in-flight movement of doors. As already seen, the present latch assembly is pivoted in a manner to permit considerable door movement in flight while still maintaining latching security with minimal wear of the latch assembly.

I claim:

1. A self-aligning latch assembly comprising:
   a first pair of angle mounting brackets for pivotally supporting a pin support casting for housing a clamping pin, said pin support member having a pair of trunnions at one end thereof and a flared portion at the other end thereof for contacting a funnel-shaped member to provide self-alignment of said latch assembly;
   a second pair of angle mounting brackets for pivotally supporting a funnel-shaped casting having a locking receptacle at the closed end of said funnel-shaped member for engagement of said clamping pin; and
   centering springs coupled to said first and second pairs of angle mounting brackets for providing the self-aligning latching function.

* * * * *